United States Patent
Sudarshan et al.

(10) Patent No.: US 9,118,465 B2
(45) Date of Patent: *Aug. 25, 2015

(54) METHOD FOR SUPPORTING FLEXIBLE FRAME STRUCTURES IN WIRELESS COMMUNICATION SYSTEMS

(75) Inventors: Pallav Sudarshan, Santa Clara, CA (US); Gerrit W Hiddink, Utrecht (NE); Xiangyang Zhuang, Lake Zurich, IL (US)

(73) Assignee: Google Technology Holdings LLC, Mountain View, CA (US)

(*) Notice: Subject to any disclaimer, the term of this patent is extended or adjusted under 35 U.S.C. 154(b) by 288 days.

This patent is subject to a terminal disclaimer.

(21) Appl. No.: 12/388,727

(22) Filed: Feb. 19, 2009

(65) Prior Publication Data

US 2009/0219841 A1 Sep. 3, 2009

Related U.S. Application Data

(60) Provisional application No. 61/030,471, filed on Feb. 21, 2008.

(51) Int. Cl.
*H04J 1/00* (2006.01)
*H04L 5/14* (2006.01)
(Continued)

(52) U.S. Cl.
CPC .............. *H04L 5/14* (2013.01); *H04L 5/0007* (2013.01); *H04L 5/0091* (2013.01); *H04L 5/0094* (2013.01); *H04W 72/121* (2013.01); *H04W 72/1289* (2013.01); *H04W 72/1273* (2013.01)

(58) Field of Classification Search
CPC ... H04L 5/0007; H04L 5/0091; H04L 5/0094; H04L 5/14; H04W 72/1273; H04W 72/1289; H04W 72/121

USPC .............. 370/311, 329, 330, 335, 336, 236.2, 370/347, 349, 281; 375/240.25; 382/232
See application file for complete search history.

(56) References Cited

U.S. PATENT DOCUMENTS 5,025,254 A 6/1991 Hess
6,031,827 A * 2/2000 Rikkinen et al. .............. 370/330
(Continued)

FOREIGN PATENT DOCUMENTS

EP 0713347 A2 5/1996
EP 1718096 B1 11/2009
WO 2004004244 A1 1/2004

OTHER PUBLICATIONS

Patent Cooperation Treaty, "PCT Search Report and Written Opinion of the International Searching Authority" for International Application No. PCT/US2009/034814 Jan. 4, 2010, 12 pages.
(Continued)

*Primary Examiner* — Andrew Lai
*Assistant Examiner* — Albert Shih
(74) *Attorney, Agent, or Firm* — Faegre Baker Daniels LLP

(57) ABSTRACT

A wireless communication base station is disclosed, configured to serve a plurality of user terminals in a series of downlink radio frames wherein user terminals in a first group are served in a first temporal region of the downlink radio frame and user terminals in a second group are served in the second temporal region of the downlink radio frame. A downlink radio frame contains an indicator signaling a change of duration of either of the first or second temporal region of at least one downlink radio frame in a series of downlink radio frames.

11 Claims, 12 Drawing Sheets

(51) Int. Cl.
*H04L 5/00* (2006.01)
*H04W 72/12* (2009.01)

(56) References Cited

U.S. PATENT DOCUMENTS

| | | | | |
|---|---|---|---|---|
| 6,631,116 | B1* | 10/2003 | Eneroth et al. | 370/236.2 |
| 6,996,060 | B1 | 2/2006 | Dahlby et al. | |
| 7,002,929 | B2 | 2/2006 | Struhsaker et al. | |
| 7,352,714 | B2 | 4/2008 | Balachandran et al. | |
| 2002/0006165 | A1* | 1/2002 | Kato | 375/240.25 |
| 2002/0015529 | A1* | 2/2002 | Kato | 382/232 |
| 2002/0064140 | A1* | 5/2002 | Numminen | 370/311 |
| 2002/0102948 | A1* | 8/2002 | Stanwood et al. | 455/91 |
| 2004/0057407 | A1* | 3/2004 | Balachandran et al. | 370/336 |
| 2006/0245380 | A1 | 11/2006 | Lenzini et al. | |
| 2007/0177537 | A1 | 8/2007 | Wandel et al. | |
| 2007/0268848 | A1 | 11/2007 | Khandekar et al. | |
| 2008/0101355 | A1 | 5/2008 | Ojala et al. | |
| 2008/0144612 | A1 | 6/2008 | Honkasalo et al. | |
| 2009/0092067 | A1* | 4/2009 | Sudarshan et al. | 370/281 |

OTHER PUBLICATIONS

IEEE 802.16 "Part 16: Air Interface for Broadband Wireless Access Systems", Section 8.4.4 P802.16Rev2/D5 (Jun. 2008) pp. 704-726.
Patent Cooperation Treaty, "PCT Search Report and Written Opinion of the International Searching Authority" for International Application No. PCT/US2008/078280 May 6, 2009, 20 pages.
United States Patent and Trademark Office, "Non-Final Rejection" for U.S. Appl. No. 11/868,526 Oct. 5, 2010, 36 pages.
United States Patent and Trademark Office, "Final Rejection" for U.S. Appl. No. 11/868,526 Jul. 12, 2010, 19 pages.
United States Patent and Trademark Office, "Non-Final Rejection" for U.S. Appl. No. 11/868,526 Jan. 7, 2011, 09 pages.
United States Patent and Trademark Office, "Non-Final Rejection" for U.S. Appl. No. 11/868,526 Jul. 6, 2011, 15 pages.

* cited by examiner

METHOD FOR SUPPORTING FLEXIBLE FRAME STRUCTURES IN WIRELESS COMMUNICATION SYSTEMS

FIELD OF THE DISCLOSURE

The present disclosure relates generally to wireless communications and more particularly to more reliable methods for signaling frame structures that can be flexibly configured to serve half-duplex users or a mixture of half-duplex and full-duplex users.

BACKGROUND

In some wireless communication protocols, for example, in Half Duplex Frequency Division Duplex (HD-FDD) mode, the communication devices cannot transmit and receive at the same time. In such systems, the base station (BS) must ensure that the uplink (DL) and downlink (UL) traffic for these devices are not scheduled simultaneously. In addition, adequate time should be reserved to allow the HD communication devices to switch between transmission and reception mode. For HD-FDD mode systems, for example, a group-based frame structure is a well-known structure that simplifies traffic scheduling. In group-based frame structures, users are divided into multiple groups such that the DL traffic for one group does not overlap with the UL traffic for that group. Based on this general concept, it is desirable to provide an efficient frame structure to enable various grouping strategies and the necessary mechanism to reliably signal the dynamic frame structure.

The various aspects, features and advantages of the invention will become more fully apparent to those having ordinary skill in the art upon a careful consideration of the following Detailed Description thereof with the accompanying drawings described below. The drawings may have been simplified for clarity and are not necessarily drawn to scale.

DETAILED DESCRIPTION

Figure 1:
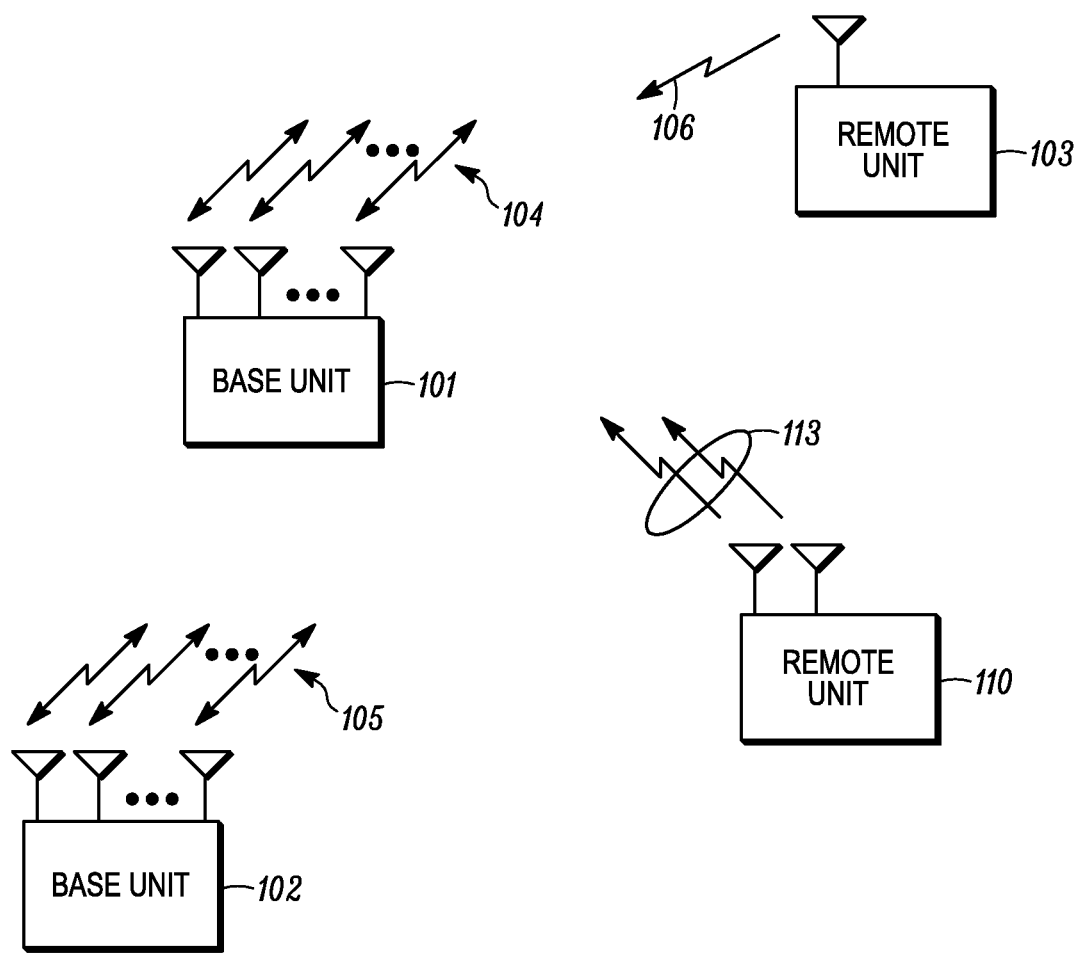
FIG. 1 illustrates a wireless communication system.

In FIG. 1, the wireless communication system 100 includes one or more fixed base infrastructure units forming a network distributed over a geographical region. A base unit may also be referred to as an access point, access terminal, base station, Node-B, eNode-B, or by other terminology used in the art. The one or more base units 101 and 102 serve a number of remote units 103 and 110 within a serving area, for example, a cell, or within a cell sector. In some systems, one or more the base units are communicably coupled to a controller forming an access network that is communicably coupled to one or more core networks. The disclosure however is intended not to be limited to any particular wireless communication system architecture.

Generally, the serving base units 101 and 102 transmit downlink communication signals 104 and 105 to remote units in the time and/or frequency domain. Remote units 103 and 110 communicate with one or more base units 101 and 102 via uplink communication signals 106 and 113. The one or more base units may comprise one or more transmitters and one or more receivers that serve the remote units. The remote units may be fixed or mobile user terminals. The remote units may also be referred to as subscriber units, mobile stations, users, terminals, subscriber stations, user equipment (UE), user terminals, or by other terminology used in the art. The remote units may also comprise one or more transmitters and one or more receivers. The remote units may have half-duplex (HD) or full-duplex (FD) transceivers. Half-duplex transceivers do not transmit and receive simultaneously whereas full duplex terminals do.

In one embodiment, the communication system utilizes OFDMA or a next generation single-carrier (SC) based FDMA architecture for uplink transmissions, such as interleaved FDMA (I-FDMA), Localized FDMA (L-FDMA), DFT-spread OFDM (DFT-SOFDM) with IFDMA or LFDMA. In OFDM based systems, remotes units are served by assigning downlink or uplink radio resources that typically consist of a set of subcarriers over one or more OFDM symbols. Exemplary OFDM based protocols include the developing 3GPP LTE standard and IEEE 802.16 standard.

In some implementations, the serving base station serves user terminals in one or more groups based on one or more grouping criterion. Generally, at least two user terminals are assigned to at least one group. In one implementation, for example, the base station groups multiple user terminals in first and second groups. Some user terminals, for example, HD user terminals are generally served in not more than one group, while FD user terminals may be served in multiple groups simultaneously. Grouping can be dynamically adjusted based on one or more grouping criterion selected from the following set: the signal to interference plus noise ratio (SINR) of the user terminal; whether or not the user terminal is currently receiving multicast/broadcast services; the quality of service (QoS) requirements of the user terminal; the geographical location of the user terminal; half-duplex or full-duplex capability of the user terminal; whether the user terminal is in active state, sleep state, or inactive state; and group load balancing considerations.

Figure 2:
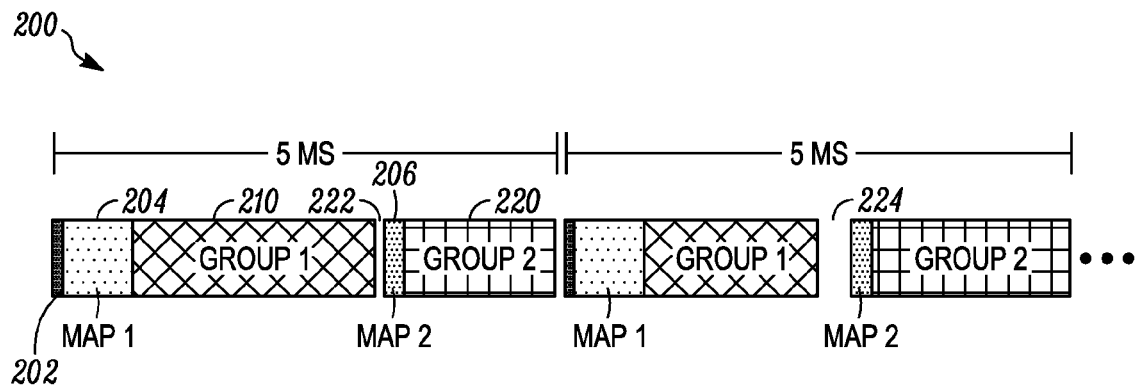
FIG. 2 is a series of downlink radio frames that are divided into two temporal non-overlapping regions separated by a temporal gap to serve two user groups.

Generally, the user terminals are served in a series of downlink radio frames. In one implementation, a downlink radio frame is divided into one or more regions, wherein each region serves a corresponding group of user terminals. FIG. 2 illustrates a series of downlink radio frames 200, 201 . . . wherein each frame has a temporal duration, for example, 5 ms. In other embodiments, the duration may have other values. In FIG. 2, each frame includes a first temporal region 210 and a second temporal region 220 wherein user terminals in a first group are served in the first temporal region and user terminals in a second group served in the second temporal region. FIG. 2 also illustrates a temporal gap 222 after the first region 210 in each downlink radio frame. Similarly, in FIG. 2 there is a gap after the second region 220 before the next frame 201. In some other implementations, there may not be a gap after each region. In some embodiments such as in the IEEE 802.16 standard, each downlink frame includes a preamble 202, as shown in FIG. 2.

Each frame generally includes a message that conveys the control information to user terminals. The message includes information of the downlink or uplink resource assignment to specific user terminals, paging, instruction to user terminals for proper system operation, information regarding the frame structure, and more. In the example of IEEE 802.16 standard, such control message is referred to as MAP message. In some embodiments, a single MAP message is transmitted to user terminals in all groups regarding resource assignment for both the first and second regions. However, no HD user terminals that need to receive the MAP will be able to transmit during a MAP message in this arrangement, which causes some waste of uplink air time. In another embodiment, a separate MAP is provided in each of the first and second regions to allocate user terminals of each group resources within their respective regions. In FIG. 2, for example, a MAP1 204 is associated with the first temporal region and MAP2 206 is associated with the second temporal region. In one implementation, the MAP1 is considered to be a part of the first region and the MAP2 is considered to be a part of the second region.

Figure 3:
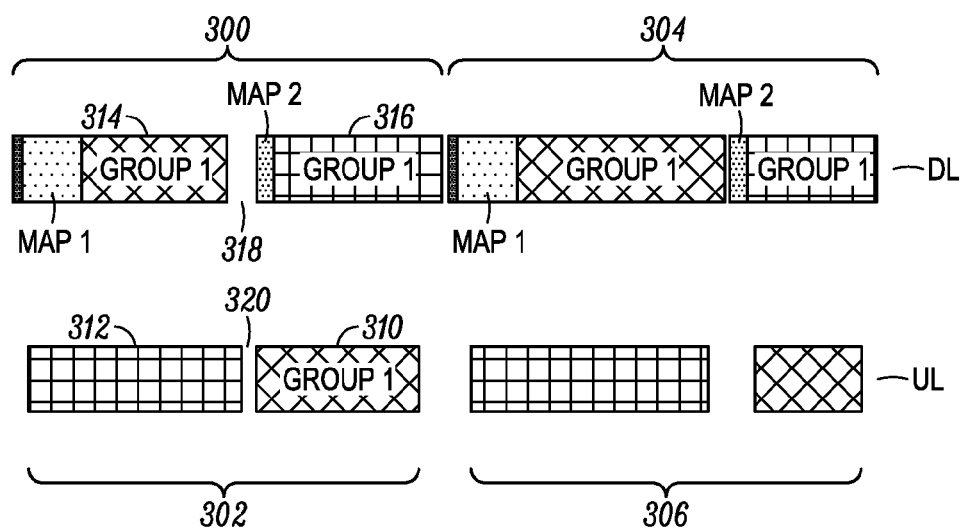
FIG. 3 is a series of downlink and corresponding uplink radio frames serving two groups of half-duplex users with two temporal non-overlapping regions in each frame.

In some implementations, the user terminals are also served in a series of uplink radio frames. In systems with both uplink (UL) and downlink (DL) frames, there is generally a corresponding uplink radio frame for each downlink frame. An uplink and corresponding downlink frame may or may not temporally overlap. FIG. 3 illustrates a series of downlink radio frames and a corresponding series of uplink frames, wherein DL frame 300 corresponds to uplink frame 302 and DL frame 304 corresponds to UL frame 306. In FIG. 3 the uplink and corresponding downlink frames temporally overlap. In FIG. 3, the DL frames also include first and second temporal regions, for example, DL frame 300 includes the first temporal region 314 and the second temporal region 316. In one implementation, each uplink radio frames is also divided into one or more regions, wherein each region serves a corresponding group of user terminals. In FIG. 3, for example, UL frame 302 includes a first temporal region 310 and a second temporal region 312. The first temporal region of the UL frame serves user terminals in a first group and the second temporal region thereof serves users in a second group. As one implementation, FIG. 3 shows an uplink radio frame that also contains a gap between the first and second region in each frame and a temporal gap between the second region of a frame and the first region of the next uplink frame. In other implementations, not all the gaps will be present.

In embodiments where the DL and UL frames serve half-duplex users, the temporal region of the DL frame that serves user terminals in the first group does not overlap temporally with the temporal region of the corresponding UL frame that serves the user terminals in the first group. Similarly, the temporal region of the DL frame that serves user terminals in the second group does not overlap temporally with the temporal region of the corresponding UL frame that serves the user terminals in the second group. Thus in FIG. 3, the temporal region 314 in the DL frame that serves Group 1 users does not overlap with the temporal region 310 of the UL frame. Similarly, the temporal region 316 of the DL frame does not overlap temporally with the temporal region 312 of the UL frame as both regions serve users in Group 2.

In some implementations, a temporal gap is provided between two regions in either a DL or corresponding UL frame. In FIG. 2 for example, there is a temporal gap 222 between region 210 and 220. In FIG. 3, there is a temporal gap 318 between regions 314 and 316 in the DL frame and a gap 320 between the regions 312 and 310 in the UL frame. Thus the gap may be located in either or both of the corresponding DL and UL frames. The gap in a DL radio frame 318 and the gap in the corresponding UL radio frame 320 are typically determined jointly.

The purpose of defining these two gaps is to make sure there is adequate switch time left to allow a half-duplex user to switch from the reception mode to the transmission mode, or vice versa, regardless of the propagation delay between the user terminal and the serving base station. In FDD where the DL and UL radio frames are on different frequencies, the switch time includes the time user terminals need to retune the transceiver to receive on the DL or transmit on the UL during the temporal gap. In the example of IEEE 802.16, the time required by the user terminal to switch from receive mode to transmit mode is referred to as SSRTG, and the time required by the user terminal to switch from transmit mode to receive mode is referred to as SSTTG.

In FIG. 3, a user terminal in the first group, once done with reception at the end of the first region 314, will need enough time to switch to transmission so that its uplink signal arrived at the base station starts from the beginning of the uplink region 310 for the first group. Similarly, a user terminal in the first group, once done with transmission in the uplink region 310, will need enough time to switch to the reception of a downlink signal that was sent starting from the beginning of the Group 1 region in the next downlink frame 304. Note that in a typical deployment, the gaps should be minimized so that the air time utilization is maximized, given there is no transmission during the gaps.

In one embodiment, a temporal duration of either the first or second temporal regions of at least one radio frame in the series of radio frames is changed. Typically when the duration of one region is changed, the duration of other regions will be changed as well, especially if the temporal gaps are still the same. Generally the base station is capable of implementing these duration changes based upon one or more criterion, typically under the control of a programmable digital processor. In FIG. 2, for example, the duration of the first and second temporal regions of the DL frames 200 is different from the durations of the first and second temporal regions of frame 201. In FIG. 3, the durations of the temporal regions in both the DL and corresponding UL frames are changed. In implementations where HD user terminals are served, such changes are constrained by the requirement that the regions of the DL and UL frames serving users in the same groups do not overlap temporally, as discussed above. The changes to the durations of the temporal regions may be changed periodically or aperiodically. Thus the temporal duration of the regions may be changed on a frame by frame basis or every nth frame or pursuant to some irregular schedule.

In one embodiment, the duration of either of the temporal regions is changed based upon the assignment of user terminals to groups. For example, any change of the grouping criteria could trigger a change to the durations of regions corresponding to different groups. The set of grouping criteria include the signal to interference plus noise ratio (SINR) of each user terminal; the amount of traffic for multicast/broadcast services; the quality of service (QoS) requirements of the user terminal; the geographical location of the user terminal; the mix of half- and full-duplex user terminals, loading in each group, and the traffic pattern in both downlink and uplink. As an example, a base station can increase the duration of a downlink region if it observes the group has more downlink traffic. Similar adjustment can be done when a group has more uplink traffic. Another example is that a base station can adjust the duration of the downlink region according to the amount of MBS traffic that resides in that region. In another embodiment, the duration of the temporal regions is changed based upon the number of terminals assigned to each group. For example, when a base station observes an increasing number of good SINR users, it can increase the duration of the corresponding region.

In one embodiment, a configuration of the temporal gap in at least one frame of the series of frames is changed. The reconfiguration of a temporal gap is often closely related to changing the duration of either of the temporal regions. In FIG. 2, the configuration of the temporal gap is changed by changing the temporal duration of the gap. The duration of temporal gap 224 in frame 201 is greater than the gap in frame 200. As a result of the change of the temporal gap, the durations of at least one region will change as well. The configuration of the temporal gap may also be changed by changing the location of the gap. For example, the gap or a portion thereof may be moved from the DL frame to the UL frame or vice versa. The duration and location of the gap in the downlink frame and the gap in the uplink frame is typically considered jointly, which are also tied to the adjustment of durations of uplink regions for each group and the durations of downlink regions for each group.

By changing the durations and locations of the temporal gaps in the downlink and uplink, the total number of symbols in the downlink radio frame (sum over all the temporal regions) and the total number of symbols in the uplink radio frame (sum over all the temporal regions) can be changed. In the example of IEEE 802.16, in one system configuration the symbol duration for 10 MHz bandwidth is 102.86 us and the frame duration is 5 ms. This numerology allows for a maximum of 48 symbols in a downlink radio frame, with a residual time of approximately 62 us (fraction of a OFDM symbol duration) that can be used. One configuration of the temporal gap can give a total of 48 symbols (including preamble) in the DL radio frame and, if assuming 100 us SSRTG and 100 us SSTTG, 43 symbols in the UL radio frame, while another configuration of the gap can give a total of 47 symbols (including preamble) in the DL radio frame and 44 symbols in the UL radio frame. In this example, the usable DL symbols can be reduced by either one or two OFDM symbols while the usable UL symbols will be increased by the same number. The total number of symbols in the DL radio frame and UL radio frame can be fine tuned depending on the downlink and uplink traffic load.

Flexibility in the number of DL symbols and UL symbols provided by reconfiguration of the temporal gap can be useful in situations when there are constraints on the total number of useful UL symbols. For example, the total number of symbols in the UL radio frame may need to be a multiple of 3 in case of a PUSC permutation in the current IEEE 802.16 standard.

Also, the gap or a portion thereof may be moved within the same frame. For example, a portion of the gap may be moved to the end of the frame. The changes to the configuration of the temporal gap may be changed periodically or aperiodically. Thus the temporal duration of the gaps may be changed on a frame by frame basis or every nth frame or pursuant to some irregular schedule.

The base station generally indicates the locations and durations of the first and second temporal regions of each uplink and downlink radio frame. The information unambiguously specifies the downlink and corresponding uplink frame structure. Various different subsets of parameters can be used to signal the frame structure. The parameters include a temporal gap in the DL or UL, the starting and ending position of a DL/UL region, a duration of a DL/UL region. In the example of a downlink frame having only first and second temporal regions, only two parameters are needed: an offset value parameter (in OFDM symbols for example) specifying an end of the first temporal region from a reference point of the downlink frame (for example the beginning of the frame and this value is the duration of the first region then), and an offset value parameter specifying a start of the second temporal region. The duration of the second downlink region, in terms of the number of OFDM symbols, can be easily derived. In this particular example, the durations and locations of the two uplink regions are also known once the downlink regions are specified. This is based on the assumption that the DL/UL gaps for the first and second groups are known to the system. The first temporal region in the uplink radio frame starts a fixed number of samples after the end of the first temporal region in the downlink radio frame (RTG), and the second temporal region in the uplink radio frame ends a fixed number of samples before the start of the second temporal region in the downlink radio frame (TTG).

In one embodiment, each downlink radio frame contains an indication of the locations and durations of the first and second temporal regions of a subsequent uplink and downlink radio frame. In a more particular implementation, each downlink radio frame (e.g., frame #n) contains an indication of the locations and durations of the first and second temporal regions of the one after the next uplink and downlink radio frame (i.e., frame #n+2). The indication of the locations and durations for frame #n+2 is conveyed in both the first and the second temporal regions of the downlink radio frame #n. Frame #n will be referred to as the frame that a frame structure change is initiated and frame #n+2 will be referred to as the frame that a change is effected (i.e., take into effect).

In another implementation, each downlink radio frame (e.g., frame #n) contains an indication of the locations and durations of the first and second temporal regions of next uplink and downlink radio frame (i.e., frame #n+1) and the one after the next uplink and downlink radio frame (i.e., frame #n+2).

In another implementation, each downlink radio frame (e.g., frame #n) contains an indication of the location and duration of the first downlink temporal region of the one after the next uplink and downlink radio frame (i.e., frame #n+2). The temporal gap between the end of the first downlink temporal region and the start of the second downlink temporal region is indicated on a less frequent periodicity. In the example of IEEE 802.16, the information on the temporal gap may be included in the DCD or UCD. The location and the duration of the second downlink temporal region can be easily derived from the first downlink temporal region and the temporal gap.

In another implementation, each downlink radio frame (e.g., frame #n) contains an indication of the location and duration of the first temporal region of the next uplink and downlink radio frame (i.e., frame #n+1) and of the one after the next uplink and downlink radio frame (e.g., frame #n+2). The temporal gap between the end of the first temporal region and the start of the second temporal region is indicated on a less frequent periodicity. In the example of IEEE 802.16, the information on the temporal gap can be included in the DCD or UCD. The location and the duration of the second temporal region can be easily derived from the first downlink temporal region and the temporal gap.

In one implementation, the temporal gap between the end of the first temporal region and the start of the second temporal region in the downlink radio frame can be a fixed value that is defined a priori at the base station and known to the user equipment. In a more specific implementation, the base station can broadcast the value of the downlink temporal gap to override the a priori defined value of the temporal gap. After the temporal gap in the downlink is known, the value of the temporal gap in the uplink between the end of the first temporal region and the start of the second temporal region can be derived. By adjusting the value for the downlink temporal gap, different utilization ratios in downlink and uplink frames can be achieved. In one example, the duration of the temporal gap in the downlink radio frame is zero, which achieves maximal air-time utilization on the downlink. In another example, the duration of the downlink temporal gap is set to a maximal value that will make the temporal gap in the uplink frame zero, which achieves maximal air-time utilization on the uplink. In another example, the temporal gap is set to a middle value so that there is some temporal gap within both downlink radio frame and uplink radio frame.

In another implementation, the uplink temporal gap between the end of the first temporal region and the start of the second temporal region in the uplink radio frame can be a fixed value that is defined a priori at the base station and known to the user equipment. In a more specific implementation, the base station can broadcast the value of the temporal gap to override the a priori defined value of the temporal gap. After the temporal gap in the uplink is known, the value of the temporal gap in the downlink between the end of the first temporal region and the start of the second temporal region can be derived.

In the example of IEEE 802.16, in one implementation, the duration of the first temporal region in the next frame can be indicated using the 'No. of OFDMA Symbols' field in DL MAP message and the duration of the first temporal region in the one after the next frame can be indicated using 'No. of OFDMA Symbols' field in UL MAP message. In another implementation, the duration of the first temporal region in the next frame can be indicated using the symbol 'No. of OFDMA Symbols' field in UL MAP message and the duration of the first temporal region in the one after the next frame can be indicated using the 'No. of OFDMA Symbols' field in DL MAP message. If a compressed MAP is used, then the duration of the first temporal region in the next frame can be indicated using the 'No. of OFDMA Symbols' field in compressed DL MAP message and the duration of the first temporal region in the one after next frame can be indicated using the 'No. of OFDMA Symbols' field in compressed UL MAP message. In another implementation, the duration of the first temporal region in the next frame can be indicated using the 'No. of OFDMA Symbols' field in the compressed UL MAP message and the duration of the first temporal region in the one after the next frame can be indicated using the 'No. of OFDMA Symbols' field in compressed DL MAP message.

In the example of IEEE 802.16, a TLV field such as 'Temporal gap in DL' can be defined in the DCD or UCD to indicate the temporal gap between the end of the first temporal region in the downlink radio frame and the start of the second temporal region in the downlink radio frame.

In the example of IEEE 802.16, the duration of the first temporal region in the next downlink radio frame can be indicated using the first 6 bits of 'No. of OFDMA Symbols' field in the DL MAP message and the temporal gap in the next downlink radio frame can be signaled using the last 2 bits of 'No. of OFDMA Symbols' field in the DL MAP message. The duration of the first temporal region in the next to next frame can be indicated using the first 6 bits of 'No. of OFDMA Symbols' field in the UL MAP message and the temporal gap in the next to next downlink radio frame can be signaled using the last 2 bits of 'No. of OFDMA Symbols' field in the UL MAP message. In another implementation, the duration of the first temporal region in the next to next downlink radio frame can be indicated using the first 6 bits of 'No. of OFDMA Symbols' field in the DL MAP message and the temporal gap in the next to next downlink radio frame can be signaled using the last 2 bits of 'No. of OFDMA Symbols' field in the DL MAP message. The duration of the first temporal region in the next frame can be indicated using the first 6 bits of 'No. of OFDMA Symbols' field in the UL MAP message and the temporal gap in the next downlink radio frame can be signaled using the last 2 bits of 'No. of OFDMA Symbols' field in the UL MAP message.

Another implementation can be, again in the example of IEEE 802.16, the definition of a new TLV in the DCD or UCD to indicate the temporal gap between the end of the first temporal region in the uplink radio frame and the start of the second temporal region in the uplink radio frame.

As mentioned before, the durations and locations of the first and second temporal regions in a radio frame can be changed dynamically to provide flexibility in the frame configuration. In one implementation, the values of the duration of the first temporal region, in terms of OFDMA symbols, can span the entire range varying from zero symbols to the maximum number of symbols to fit an entire radio frame. In another implementation, the allowable values of the duration of the first temporal region, in terms of OFDMA symbols, are a subset of the range varying from zero symbols to the maximum allowable symbols in the radio frame. As an example, the allowable values for the duration of the first temporal region can only be an even number of OFDMA symbols. The duration and location of the second temporal region can be derived from the duration of first temporal region.

In one implementation, the location and duration of the first temporal region in one radio frame can be changed dynamically from one frame to another subsequent frame. In another implementation, the change in the location and duration of the first temporal region may be required to follow certain constraints in terms of duration and location of the first temporal region in previous radio frames and subsequent radio frames. In a more specific implementation, the duration of the first temporal region in a radio frame cannot be changed by more than a pre-determined number of OFDMA symbols compared to the duration of the first temporal region in the immediately preceding radio frame. This constraint may help reduce signaling overhead. Similar constraints will follow on the location and duration of the second temporal region in the corresponding radio frames.

Another embodiment deals with the inclusion of information about whether a change was or will be initiated. This information is in addition to the location and duration of a temporal region announced in the current frame that will take effect later. The purpose of including the additional information is for a user to reliably recover the frame structure information even after it missed any announcement of a change in one or two previous frames.

In one implementation, each downlink frame contains an indicator to signal that there is a change in location and duration of the first and second temporal regions as announced in a previous frame, or will be announced in a later frame. For example, the value of the indicator in a downlink frame may indicate that a change in the location and duration announced in the preceding frame and will take effect in the next frame.

In another implementation, the value of the indicator in a downlink frame may indicate that a change that will happen in the next and the one after the next frame. Specific to this implementation, the value of the indicator can be determined using the rule defined below:

Indicator=1 if a change in the location and duration of the first and second temporal regions is effected in a next radio frame and no change is effected in the one after the next radio frame.

Indicator=0 if no change in the location and duration of the first and second temporal regions is effected in the one after the next radio frame or a change in the location and duration of the first and second temporal regions is effected in a next radio frame and another change is effected in one after the next radio frame.

In another implementation, a "next-frame" change indicator in a downlink frame indicates a change will be initiated in the next frame and will take into effect three radio frames later.

The "next-frame" change indicator in a downlink radio frame can be set to 1 if a frame configuration change is initiated in the next radio frame. If no frame configuration change will be initiated in the next radio frame, the next-frame change indicator in the downlink radio frame is set to zero.

In the example of IEEE 802.16, the reserved bit in a FCH or in a DL-MAP may be used to signal the indicator.

Figure 4:
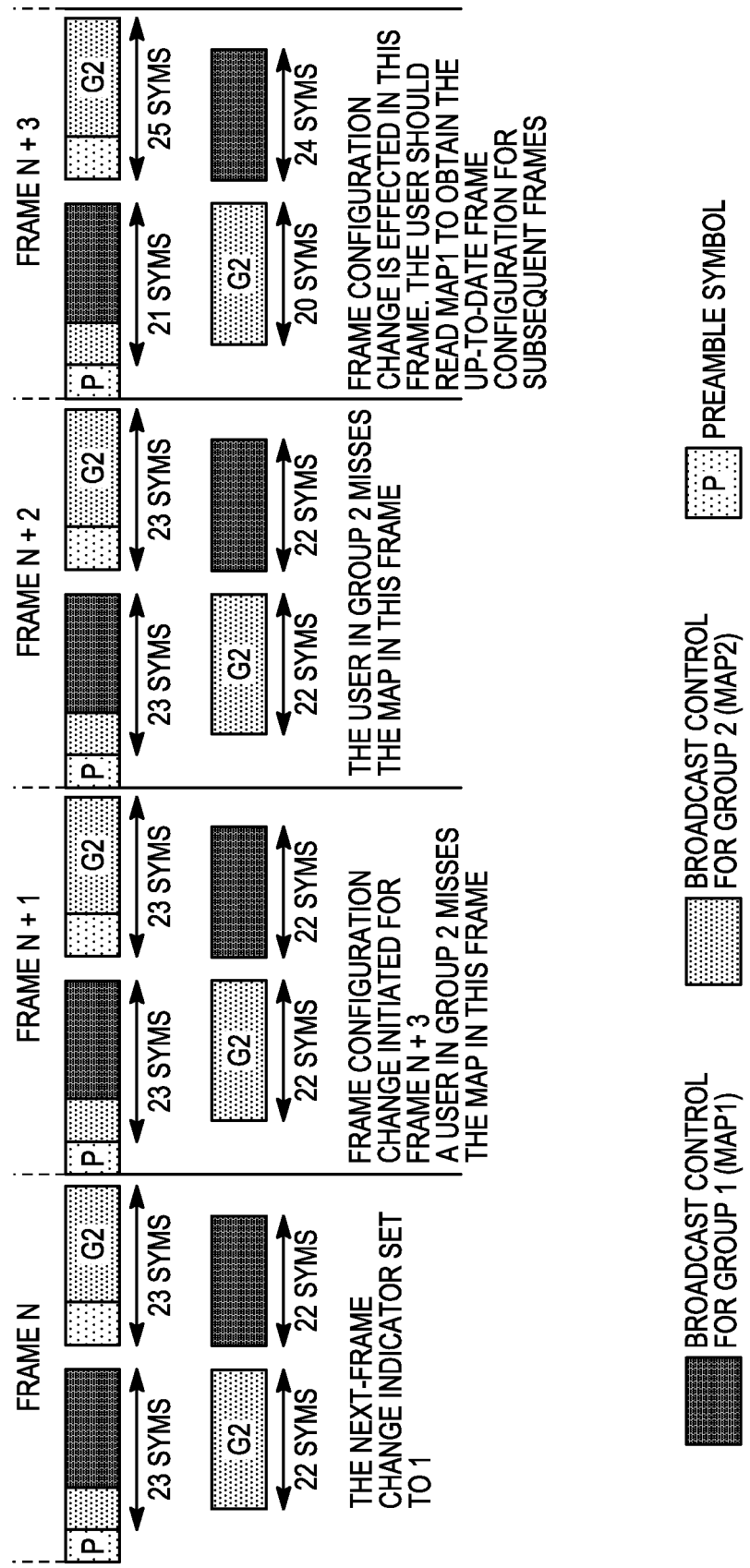
FIG. 4 illustrates the operation of a next-frame change indicator.

FIG. 4 illustrates the operation of a next-frame change indicator. In frame N, the next-frame change indicator is set to 1 and a frame configuration change is initiated in frame N+1. The frame configuration change initiated in frame N+1 is effected in frame N+3. In case that a user in group 2 is unable to decode the MAP in frame N+1 and N+2. In frame N+3, the user should attempt to read the MAP1 in group 1 because the location of second temporal region would have changed, and the user would be unable to decode the MAP2.

Figure 5:
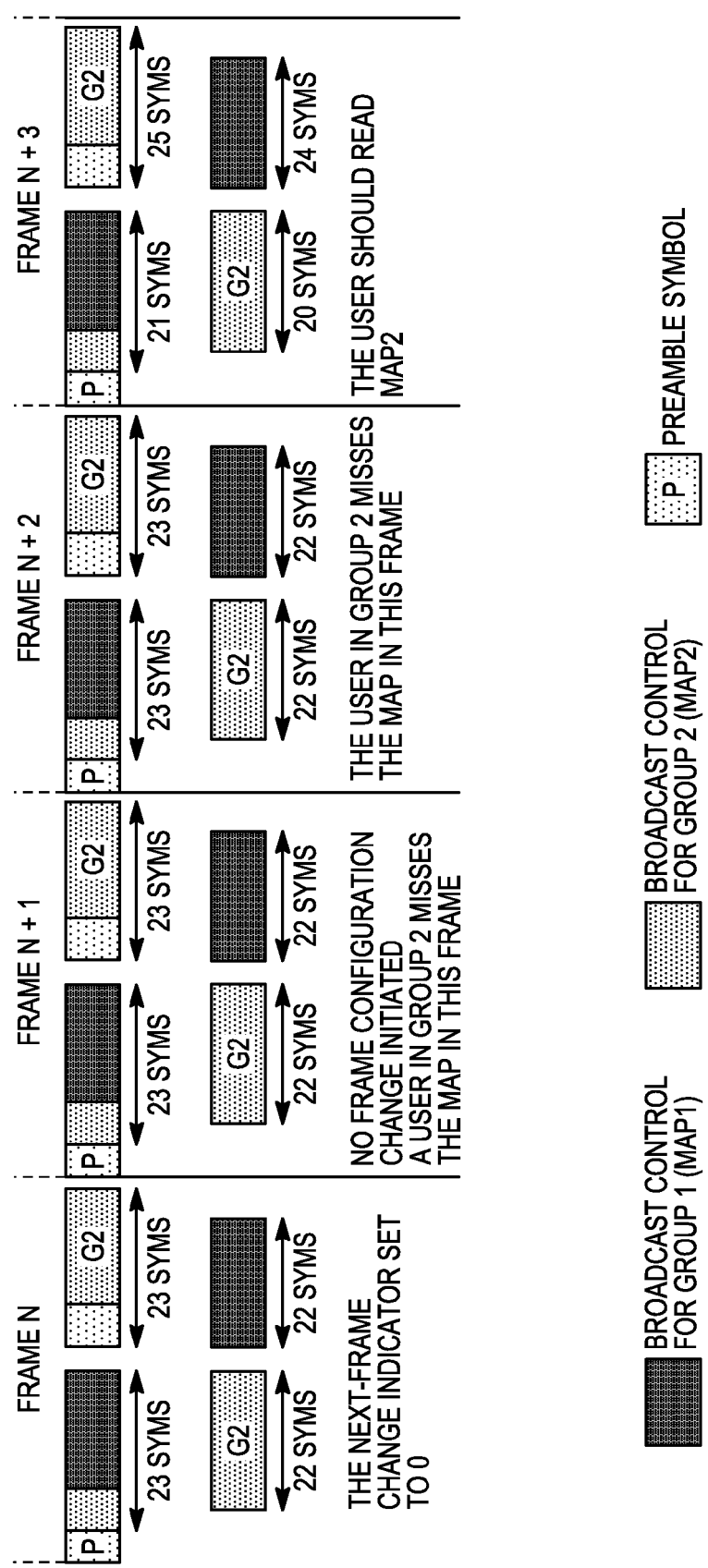
FIG. 5 illustrates the operation of a next-frame change indicator when there is no change in frame configuration.

FIG. 5 illustrates the operation of a next-frame change indicator when there is no change in frame configuration. In frame N, the next-frame change indicator is set to 0 and no frame configuration change is initiated in frame N+1. In case that a user in group 2 is unable to decode the MAP in frame N+1 and N+2. In frame N+3, the user should read the MAP2 in group 2 because the next-frame change indicator in frame N indicates that no frame configuration change is effected in frame N+3.

Figure 6:
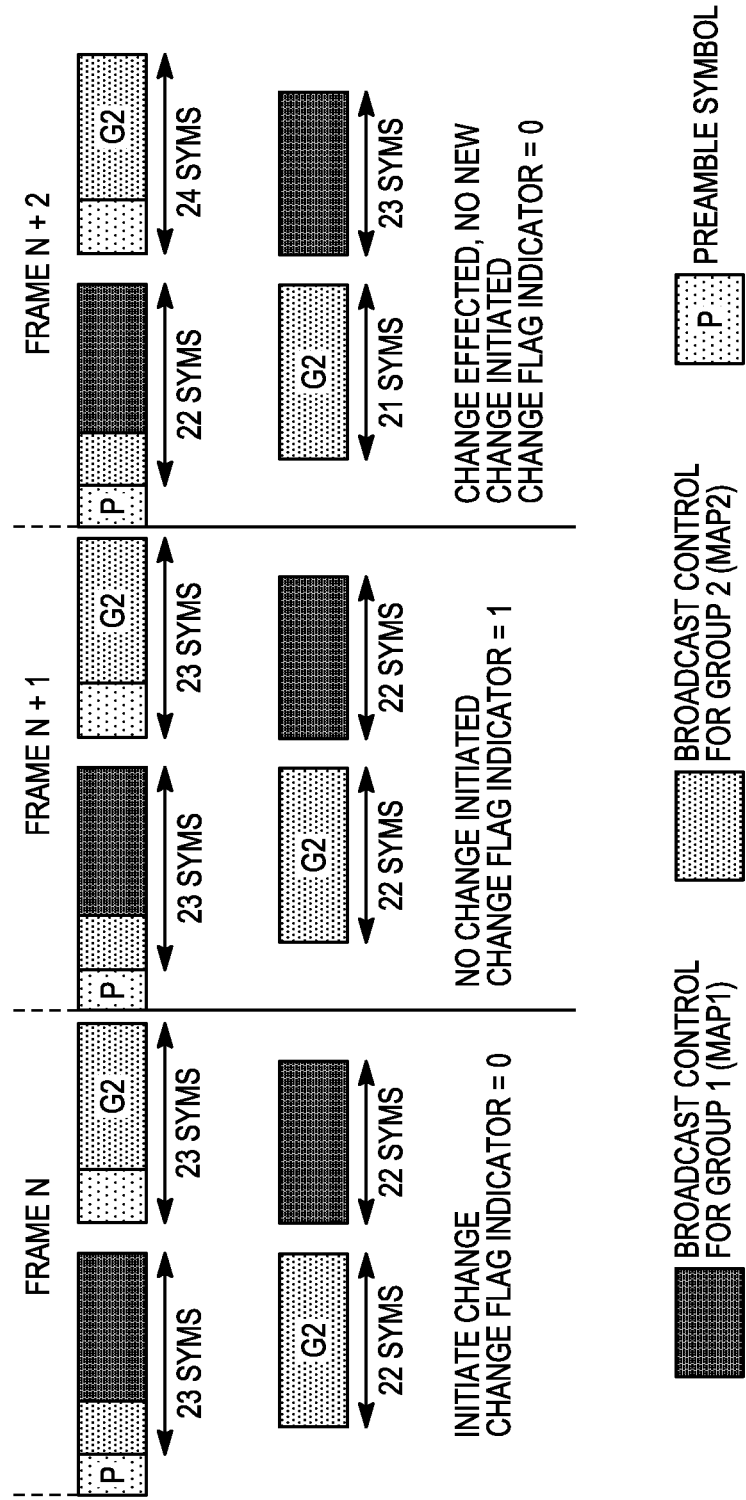
FIG. 6 illustrates a scenario with three radio frames.

FIG. 6 illustrates a scenario with three radio frames. Frame N signals a change in the duration of a first temporal region, and the change is applicable to frame N+2. Frame N+1 signals the duration of a first temporal region in frame N+3, which, in this example, is the same as in frame N+2. Since a change in frame configuration is in effect in frame N+2, and no change is in effect in frame N+3, the Boundary Change Indicator in frame N+1 is set to 1, as per the rule defined earlier. In this example, if a user is unable to decode the MAP in frame N but is able to decode the MAP in frame N+1, then the Boundary Change Indicator in frame N+1 can help the user to correctly interpret the frame configuration in frame N+2. In frame N+1, Boundary Change Indicator=1 implies that a boundary change is effected in frame N+2 and no boundary change is effected in frame N+3. Therefore, the user can apply the boundary information signaled in frame N+1 (which is normally applicable to frame N+3) to frame N+2.

Figure 7:
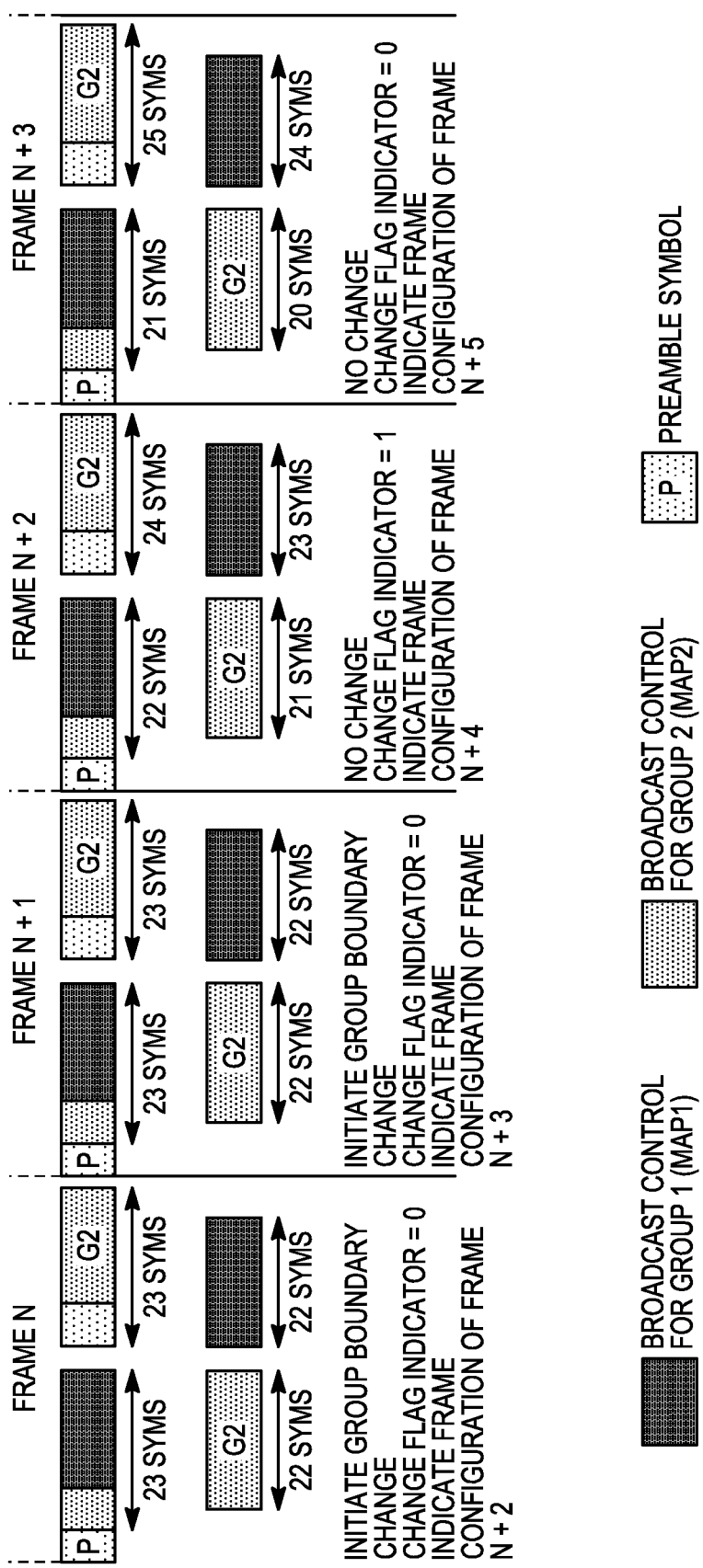
FIG. 7 illustrates a scenario with four radio frames.

FIG. 7 illustrates a scenario with four radio frames. The MAP in each frame signals the duration of the first temporal region for the frame that is two frames later. Frame N signals that the duration of a first temporal region in frame N+2 is changed, and frame N+1 signals that the duration of a first temporal region in frame N+3 is changed. The Boundary Change Indicator in frame N+1 is set to 0, as per the rule defined earlier. If a user in group 2 is unable to decode the MAP in frame N, then it will not be aware of the frame configuration in frame N+2. If the MS decodes the MAP2 in frame N+1, the flag indicator=0 implies that either no change is in effect for the next two frames, or a change is in effect in both of the next two frames. By comparing the frame configuration in frame N−1 and frame N+1, the user can infer that this is the case of two consecutive changes, and therefore in frame N+2, the user will try to get up-to-date frame configuration by decoding the MAP1. This results in a faster recovery mechanism.

Figure 8:
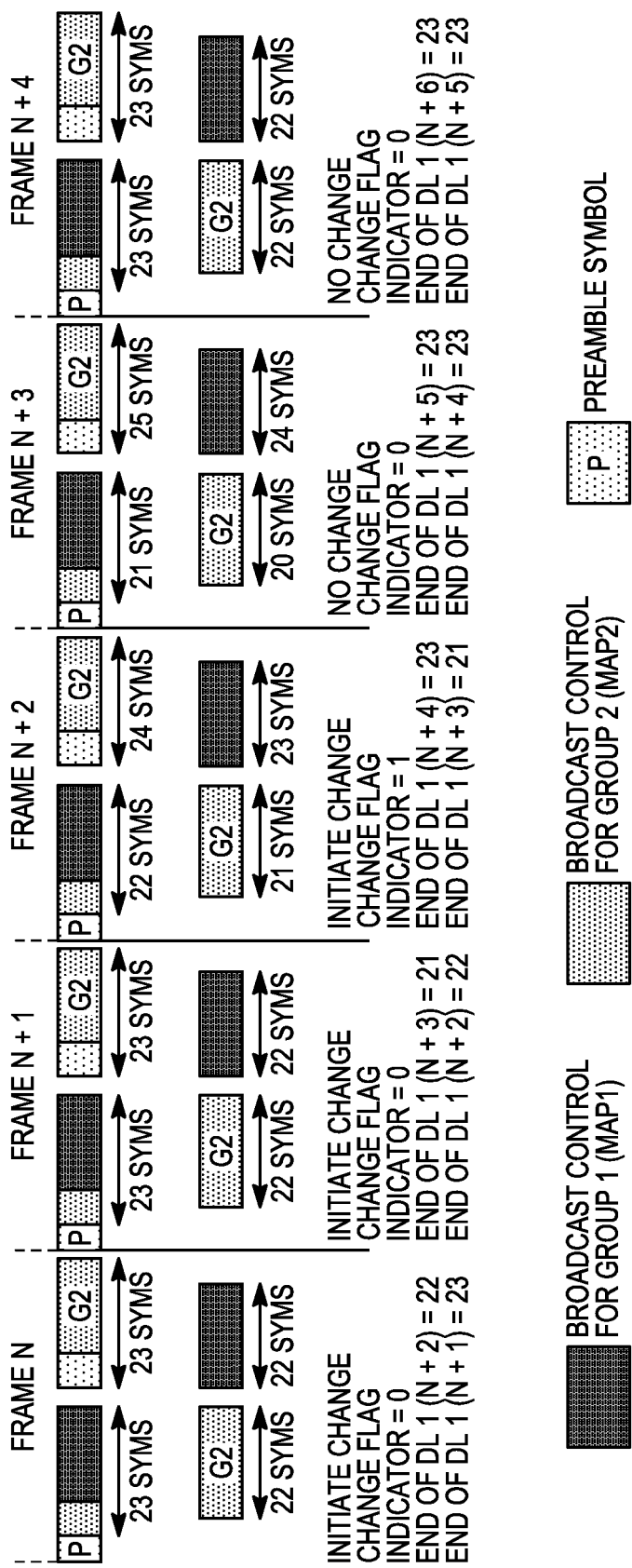
FIG. 8 illustrates a frame configuration of a next radio frame and a next to next radio frame transmitted in every radio frame.

FIG. 8 illustrates an example where the frame configuration of a next radio frame and a next to next radio frame is transmitted in every radio frame.

Figure 9:
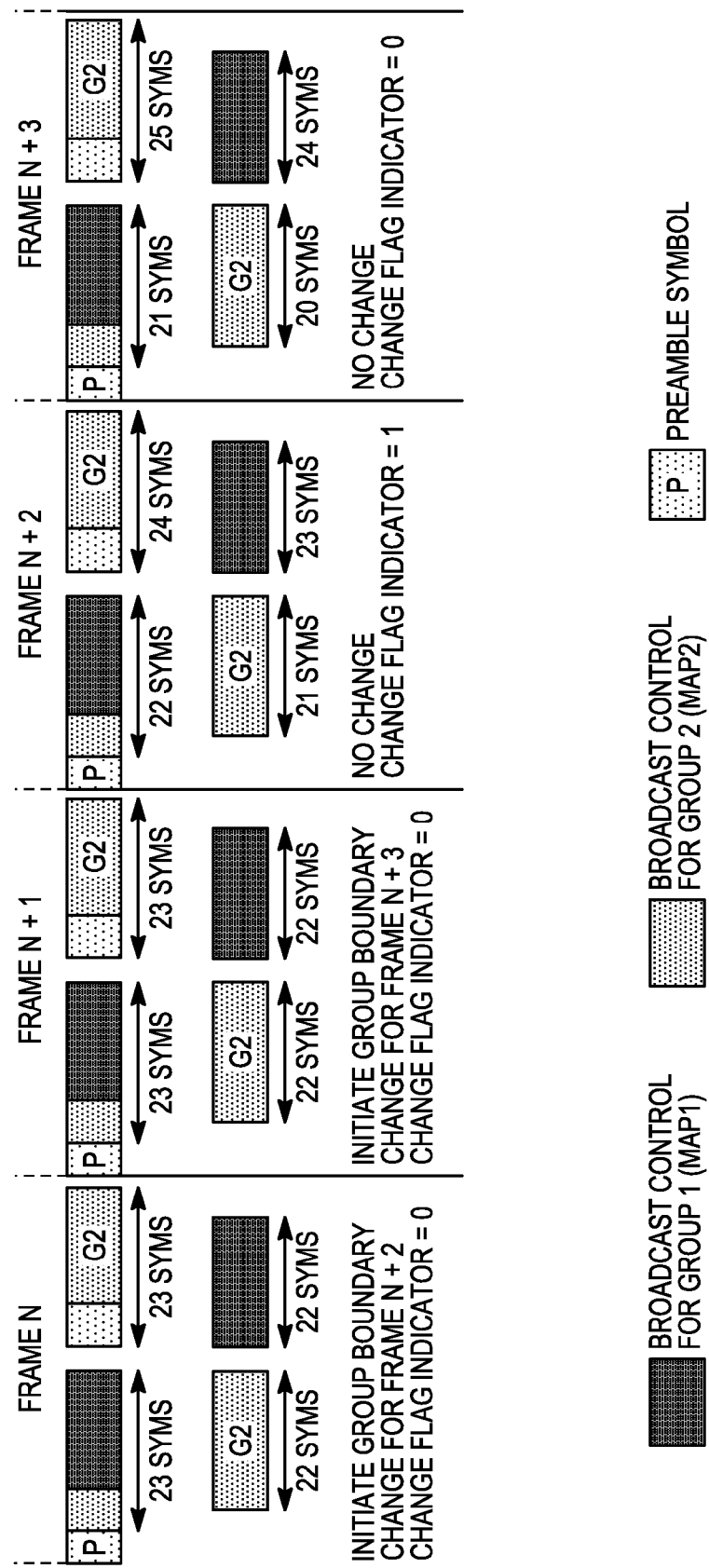
FIG. 9 illustrates a boundary change flag operation.

FIG. 9 illustrates the operation of a boundary change flag. In frame N, a change is initiated, which is affected in frame N+2, and another change is initiated in frame N+1, which is affected in frame N+3. No change is initiated in frame N+2. As per the rule defined, the indicator in frame N+1 is set to zero, and the indicator in frame N+2 is set to 1.

Figure 10:
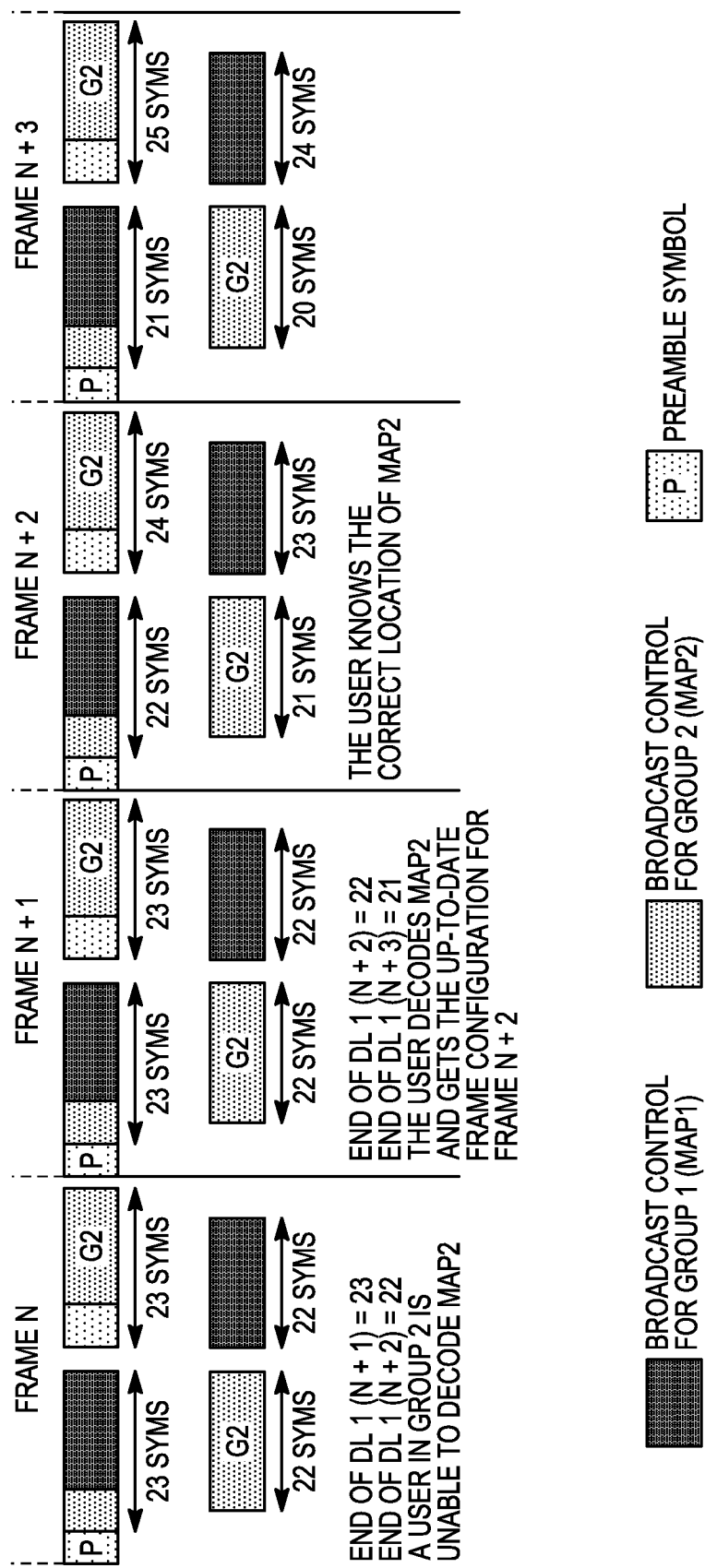
FIG. 10 illustrates broadcasting frame configuration information for a next radio frame and a next to next radio frame in every frame.

FIG. 10 illustrates the advantage of broadcasting the frame configuration information for the next radio frame and the next to next radio frame in every frame. The MAP in each frame signals the duration of the first temporal region for the frame that is two frames later, i.e. Frame N signals the frame configuration information for frame N+1 and frame N+2. Frame N signals a change in the duration of the first temporal region applicable to frame N+2. As an example, consider a user that belongs to the second group (corresponding to the second temporal region) and is unable to decode the MAP in frame N. If the user can decode the MAP in group 2 in frame N+1, it can obtain up-to-date frame configuration information for frame N+2 from frame N+1.

Figure 11:
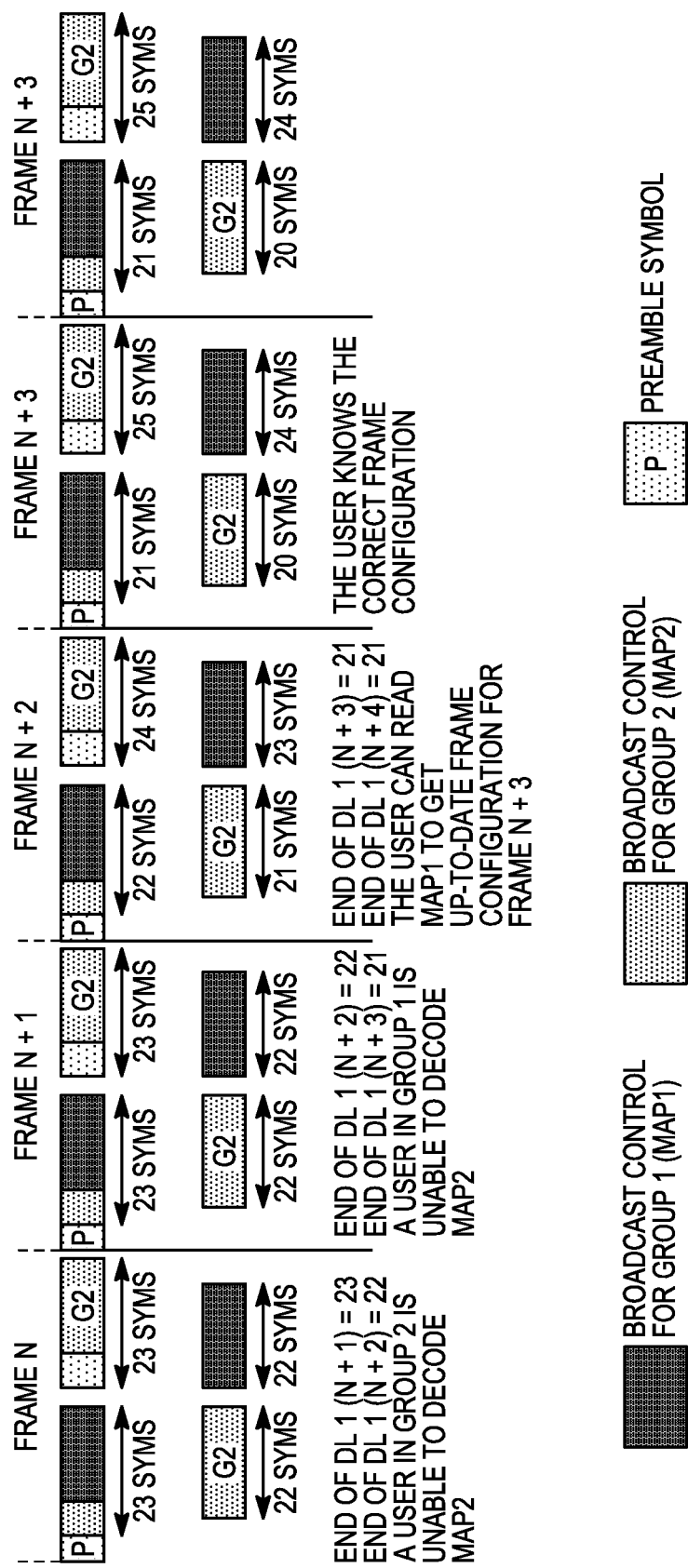
FIG. 11 also illustrates broadcasting frame configuration information for a next radio frame and a one after the next radio frame in every frame.

FIG. 11 depicts another scenario illustrating the advantage of broadcasting the frame configuration information for the next radio frame and the one after the next radio frame in every frame. As an example, consider a user that belongs to the first group (corresponding to the first temporal region), and is unable to decode the MAP in frame N and N+1, but is able to decode the MAP in frame N+2. The user will not know the frame configuration for frame N+2, but can resume normal operation in frame N+3, because it can read the frame configuration for frame N+3 from the MAP in frame N+2.

In some implementations, the base station can signal a timer, in terms of a number of frames, before which the duration and location of the first and second temporal regions is guaranteed not to be changed. A user in sleep mode that is scheduled to wake up in any frame after the frame indicated in the timer may need to obtain the updated frame configuration information before its scheduled wake-up.

In another implementation, the base station can signal a timer, in terms of a number of frames, only at which the duration and location of the first and second temporal regions may be changed.

In another implementation, a user in sleep mode that is scheduled to wake up in a frame after the frame indicated in the timer may be assigned to the first temporal region.

In a specific implementation, the frame offset before which the duration and location of the first and second temporal regions is not changed can be signaled as the exponent of a fixed number. For example, if 'p' is the value signaled, then the frame offset can be interpreted to be $a^p$, where a is an integer number that is known a priori to the base station and the user. One possible value of the integer 'a' is 'a=2'.

Figure 12:
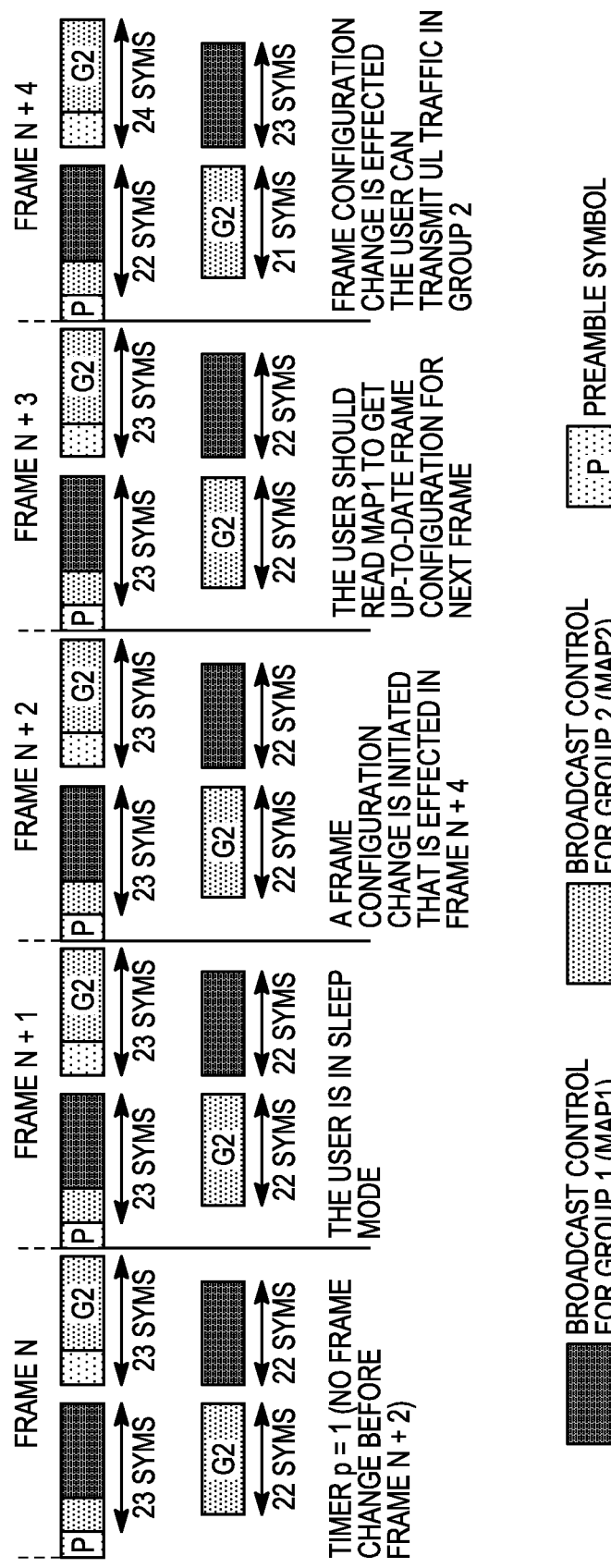
FIG. 12 illustrates sleep timer operation.

FIG. 12 illustrates the operation of a sleep timer. In frame N the value of sleep timer 'p=1'. The base station and the user terminal know the value of 'a' a priori to be 'a=2'. Therefore the number of frames before a frame configuration change will be effected is 2^1=2. A user in group 2 who is awake in frame N, and is in sleep mode for the next three frames, is scheduled to transmit uplink traffic in frame N+4. Since a frame configuration change is possible before the next wake-up frame of the user, the user should get the up-to-date frame configuration from MAP1 before its scheduled transmission in frame N+4.

Figure 13:
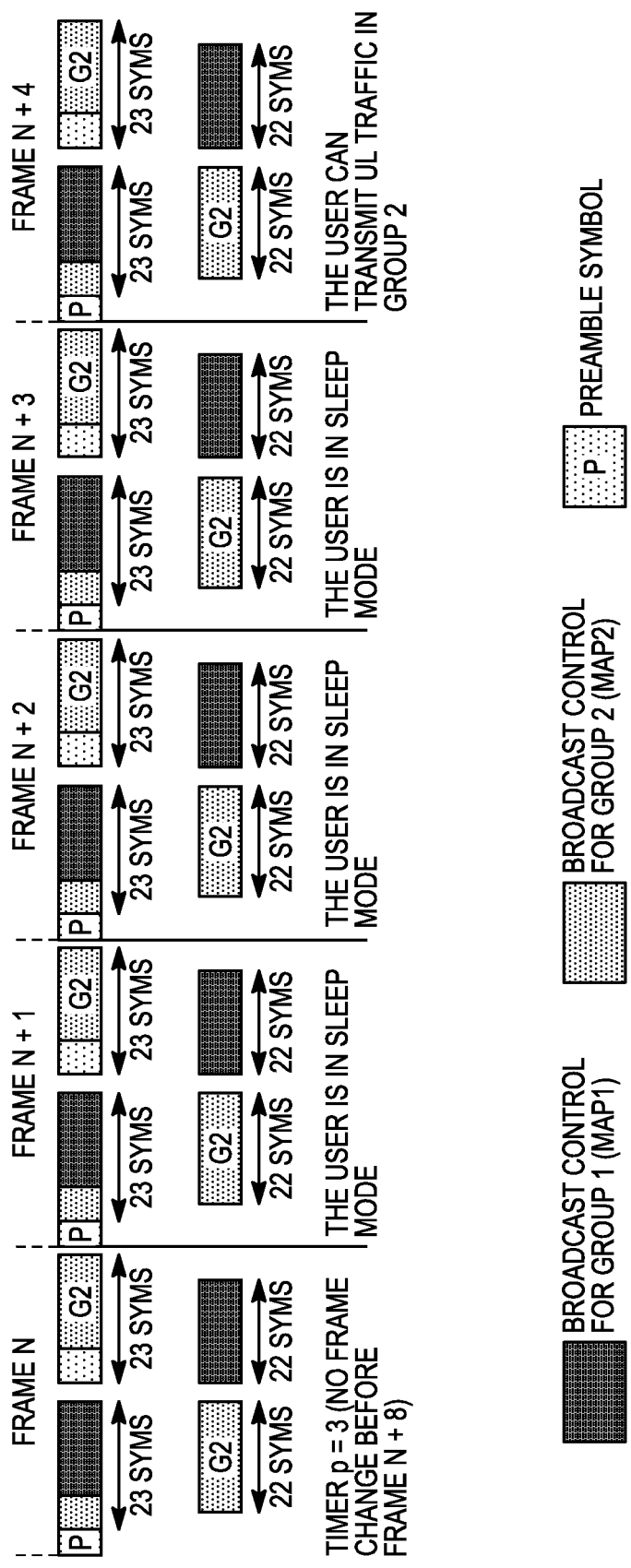
FIG. 13 illustrates another sleep timer operation.

FIG. 13 illustrates another operation of a sleep timer. In frame N, the value of sleep timer 'p=3'. The base station and the user terminal know the value of 'a' a priori to be 'a=2'. Therefore the number of frames before a frame configuration change will be effected is 2^3=8. A user in group 2 who is awake in frame N, and is in sleep mode for the next three frames, is scheduled to transmit uplink traffic in frame N+4. Since no frame configuration change is possible before the next wake-up frame of the user, the user can transmit its scheduled uplink traffic in N+4 in group 2.

In the example of IEEE 802.16, the timer can be signaled using the 4 reserved bits in FCH. In another implementation, the timer can be signaled by defining a TLV 'Frame Configuration Change Counter' in the DCD. In another implementation, the timer can be signaled defining a TLV 'Frame Configuration Change Counter' in the UCD.

A user may not know the up-to-date frame configuration of a particular frame if, out of a sequence of downlink radio frames, a user is unable to decode one or more radio frames. In that case, the user should recover the frame configuration of the current or future frames by reading the MAP message from the first temporal region since the location of MAP in the first temporal region is fixed. It is especially useful to read the MAP in first temporal region if the user does not have any uplink transmission scheduled in the uplink radio frame.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication base station, the method comprising:
   serving a plurality of user terminals in a series of downlink radio frames, the plurality of user terminals assigned to first and second groups;
   each downlink radio frame having a first temporal region and a second temporal region, the user terminals in the first group served in the first temporal region of the downlink radio frame and the user terminals in the second group served in the second temporal region of the downlink radio frame;
   changing a duration of either the first temporal region or the second temporal region of at least one downlink radio frame in the series of downlink radio frames in response to a grouping criteria adjustment representing a changed characteristic of at least one of the first group of user terminals and the second group of user terminal;
   including, in a downlink radio frame, an indicator signaling a change of duration of either the first temporal region or the second temporal region of at least one downlink radio frame in the series of downlink radio frames.

2. The method of claim 1, a value of the indicator in the downlink radio frame determined by the change of duration of either the first or second temporal regions in previous, current or subsequent downlink radio frames.

3. The method of claim 1, serving the plurality of user terminals in the series of downlink radio frames wherein at least two user terminals are assigned to one of the first and second groups.

4. The method of claim 1, wherein the characteristic represented by the grouping criteria is one of a signal to interference plus noise ("SINR"), amount of traffic for multicast/broadcast services, quality of service ("QoS") requirements, geographic location of user terminals, a mix of half-duplex and full-duplex user terminals, loading, and traffic patterns.

5. A method in a wireless communication base station, the method comprising:
   serving a plurality of user terminals in a series of downlink radio frames, the plurality of user terminals assigned to first and second groups;
   each downlink radio frame having a first temporal region and a second temporal region, the user terminals in the first group served in the first temporal region of the downlink radio frame and the user terminals in the second group served in the second temporal region of the downlink radio frame;
   changing a duration of either the first temporal region or the second temporal region of at least one downlink radio frame in the series of downlink radio frames in response to a grouping criteria change representing a dynamic characteristic of at least one of the first group of user terminals and the second group of user terminals;
   a duration of the first temporal region or the second temporal region in a downlink radio frame signaled in at least two downlink radio frames.

6. The method of claim 5, serving the plurality of user terminals in the series of downlink radio frames wherein at least two user terminals are assigned to one of the first and second groups.

7. The method of claim 5, wherein the characteristic represented by the grouping criteria is one of a signal to interference plus noise ("SINR"), amount of traffic for multicast/broadcast services, quality of service ("QoS") requirements, geographic location of user terminals, a mix of half-duplex and full-duplex user terminals, loading, and traffic patterns.

8. A wireless communication base station comprising:
   a transceiver; and
   a controller coupled to the transceiver,
   the controller configured to cause the base station to serve a plurality of user terminals in a series of downlink radio frames, each downlink radio frame having a first temporal region and a second temporal region,
   the controller configured to assign the plurality of user terminals to first and second groups, the user terminals in the first group served in the first temporal region of the downlink radio frame and the user terminals in the second group served in the second temporal region of the downlink radio frame,
   the controller configured to change a duration of either the first temporal region or the second temporal region of at least one downlink radio frame in the series of downlink radio frames in response to a dynamic grouping criteria representing a characteristic of at least one of the first group of user terminals and the second group of user terminals;
   a downlink radio frame containing an indicator signaling a change of duration of either the first temporal region or the second temporal region of at least one downlink radio frame in the series of downlink radio frames.

9. The base station of claim 8, the controller configured to determine a value of the indicator in the downlink radio frame based on a change of duration of either of the first or second temporal regions in previous, current or subsequent downlink radio frames.

10. The base station of claim 8, the controller configured to assign at least two user terminals to one of the first or second groups.

11. The wireless communication base station of claim 8, wherein the characteristic represented by the grouping criteria is one of a signal to interference plus noise ("SINR"), amount of traffic for multicast/broadcast services, quality of service ("QoS") requirements, geographic location of user terminals, a mix of half-duplex and full-duplex user terminals, loading, and traffic patterns.

\* \* \* \* \*